(12) United States Patent
Tsai et al.

(10) Patent No.: US 12,081,853 B2
(45) Date of Patent: Sep. 3, 2024

(54) CAMERA MODULE AND ELECTRONIC DEVICE

(71) Applicant: LARGAN PRECISION CO., LTD., Taichung (TW)

(72) Inventors: Wen-Yu Tsai, Taichung (TW); Chien-Pang Chang, Taichung (TW); Lin-An Chang, Taichung (TW); Ming-Ta Chou, Taichung (TW); Kuo-Chiang Chu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 156 days.

(21) Appl. No.: 17/747,015

(22) Filed: May 18, 2022

(65) Prior Publication Data
US 2022/0400193 A1   Dec. 15, 2022

Related U.S. Application Data

(60) Provisional application No. 63/209,017, filed on Jun. 10, 2021.

(30) Foreign Application Priority Data

Oct. 8, 2021  (TW) .................................. 110137430

(51) Int. Cl.
*H04N 23/55*  (2023.01)
*G02B 1/115*  (2015.01)
*H04N 23/54*  (2023.01)

(52) U.S. Cl.
CPC ............. *H04N 23/55* (2023.01); *G02B 1/115* (2013.01); *H04N 23/54* (2023.01)

(58) Field of Classification Search
CPC ........ H04N 23/55; H04N 23/54; G02B 1/115; G02B 7/021; G02B 1/118; G02B 13/18;
(Continued)

(56) References Cited

U.S. PATENT DOCUMENTS 9,158,039 B2   10/2015 Okuno et al.
9,158,040 B2   10/2015 Kamiyama et al.
(Continued)

FOREIGN PATENT DOCUMENTS

DE   112019002909 T5   6/2021

*Primary Examiner* — Abdelaaziz Tissire
(74) *Attorney, Agent, or Firm* — McClure, Qualey & Rodack, LLP

(57) ABSTRACT

A camera module includes an imaging lens assembly, an image sensor and an optical plate. The image sensor is disposed on an image surface of the imaging lens assembly. The optical plate is disposed between the imaging lens assembly and the image sensor, and includes a substrate and at least one anti-reflection layer. The substrate has an object-side surface and an image-side surface, the object-side surface faces towards an object side, the image-side surface faces towards an image side, and the object-side surface is parallel with the image-side surface. The at least one anti-reflection layer is disposed on the object-side surface or the image-side surface of the substrate, the anti-reflection layer includes a nanocrystal structure layer and an optical-connecting layer, wherein the nanocrystal structure layer includes a metal oxide crystal, the optical-connecting layer connects the substrate and the nanocrystal structure layer.

18 Claims, 21 Drawing Sheets

(58) Field of Classification Search
CPC ......... G02B 1/11; G02B 5/3041; G02B 1/111;
G02B 5/208; G02B 7/022; G02B 5/0278;
G02B 13/006; G02B 1/14; G02B
27/0025; G02B 3/0068; G02B 5/0294;
G02B 6/4246; G02B 1/10; G02B 5/20;
G02B 5/281; G02B 27/0101; G02B
27/0018; G02B 27/0172; G02B 5/0242;
G02B 5/282; G02B 6/0088; G02B 6/42;
G02B 5/0226; G02B 5/26; G02B 6/0028;
G02B 6/0065; G02B 6/4206; G02B 5/22;
G02B 1/041; G02B 6/4207; G02B
27/0955; G02B 27/0977; G02B 3/14;
G02B 6/003; G02B 6/0055; G03B 30/00;
H01L 27/14625; H01L 27/14627; H01L
27/14618; H01L 27/14629; H01L
27/14685; H01L 27/14621; H01L
31/02327; H01L 27/14687; H01L
27/14623; H01L 27/14636; H01L 27/146;
H01L 2924/01327; H01L 27/1462; H01L
27/14649; H01L 31/02162; H01L
31/0216; H01L 2224/05624; H01L
27/14818; H01L 27/14692; G02F
2201/38; G02F 1/133331; G02F 1/133512
See application file for complete search history.

(56) References Cited

U.S. PATENT DOCUMENTS

| | | | |
|---|---|---|---|
| 9,405,044 B2 | 8/2016 | Okuno | |
| 9,709,704 B2 | 7/2017 | Miyahara et al. | |
| 10,520,647 B2 | 12/2019 | Zhu et al. | |
| 10,527,764 B2 | 1/2020 | Kim et al. | |
| 10,539,716 B2 | 1/2020 | Schulz et al. | |
| 10,745,541 B2 | 8/2020 | Kubo et al. | |
| 2012/0183730 A1* | 7/2012 | Nakayama | C08G 73/10 428/141 |
| 2014/0327974 A1* | 11/2014 | Kwon | G02B 9/60 359/714 |
| 2015/0240031 A1 | 8/2015 | Nakayama | |
| 2017/0176644 A1* | 6/2017 | Nakayama | B32B 27/20 |
| 2017/0315269 A1* | 11/2017 | Ogane | C03C 17/34 |
| 2020/0310017 A1 | 10/2020 | Yu | |
| 2021/0003753 A1 | 1/2021 | Kim et al. | |
| 2021/0072439 A1 | 3/2021 | Cho et al. | |
| 2021/0136264 A1 | 5/2021 | Kim et al. | |
| 2021/0223512 A1* | 7/2021 | Nishimura | G02B 7/08 |
| 2022/0276459 A1* | 9/2022 | Kim | G02B 7/021 |
| 2022/0334360 A1* | 10/2022 | Huang | G02B 5/208 |
| 2022/0394845 A1* | 12/2022 | Chang | H04N 23/55 |

\* cited by examiner

CAMERA MODULE AND ELECTRONIC DEVICE

RELATED APPLICATIONS

This application claims priority to U.S. Provisional Application Ser. No. 63/209,017, filed Jun. 10, 2021, and Taiwan Application Serial Number 110137430, filed Oct. 8, 2021, which are herein incorporated by reference.

BACKGROUND

Technical Field

The present disclosure relates to a camera module. More particularly, the present disclosure relates to a camera module applicable to portable electronic devices.

Description of Related Art

In recent years, the portable electronic devices have developed rapidly. For example, the intelligent electronic devices and the tablets have been filled in the lives of modern people, and the camera modules employed in the portable electronic devices have also prospered. However, as technology advances, the quality requirements of the camera modules are becoming higher and higher.

Please refer to FIG. 11, which is a schematic view of a camera module 60 of the conventional art. In the conventional art, when an imaging light enters the camera module 60, an optical plate 62 of the camera module 60 will reflect the imaging light and generate the stray lights, and at least three light paths of the stray lights P1, P2, P3 will be generated, but is not limited thereto. When the imaging light enters the camera module 60, the imaging light will be reflected by the optical plate 62, and then the imaging light will be reflected by an imaging lens element 61 and generates an optical surface reflection or an optical surface total reflection, and the stray light P1 will be generated on an optical image. When the imaging light enters the camera module 60, the imaging light will pass through the optical plate 62 and generates a secondary reflection in the optical plate 62, and then the stray light P2 will be generated on the optical image. When the imaging light enters the camera module 60, the imaging light will be diffracted by a micro lens of an image sensor 63, and then the imaging light will be reflected by the optical plate 62, finally, the stray light P3 will be generated on an optical image. Therefore, the development of a camera module which can effectively eliminate the stray lights has become an important and urgent issue in the industry.

SUMMARY

According to one aspect of the present disclosure, a camera module includes an imaging lens assembly, an image sensor and an optical plate. The image sensor is disposed on an image surface of the imaging lens assembly. The optical plate is disposed between the imaging lens assembly and the image sensor, and includes a substrate and at least one anti-reflection layer. The substrate has an object-side surface and an image-side surface, the object-side surface faces towards an object side, the image-side surface faces towards an image side, the object-side surface is parallel with the image-side surface. The at least one anti-reflection layer is disposed on the image-side surface of the substrate, the at least one anti-reflection layer includes a nanocrystal structure layer and an optical-connecting layer, wherein the nanocrystal structure layer includes a metal oxide crystal, the optical-connecting layer connects the substrate and the nanocrystal structure layer, and the nanocrystal structure layer is physically contacted with the optical-connecting layer. When a material refractive index of the nanocrystal structure layer is Nc, a material refractive index of the optical-connecting layer is Nf, a height of the nanocrystal structure layer is Hc, a thickness of the optical-connecting layer is Hf, and a total height of the anti-reflection layer is H, the following conditions are satisfied: $Nf<Nc$; $Hf+Hc=H$; and $Hf<Hc$.

According to one aspect of the present disclosure, an electronic device includes the camera module of the aforementioned aspect.

According to one aspect of the present disclosure, a camera module includes an imaging lens assembly, an image sensor and an optical plate. The image sensor is disposed on an image surface of the imaging lens assembly. The optical plate is disposed between the imaging lens assembly and the image sensor, and includes a substrate and at least one anti-reflection layer. The substrate has an object-side surface and an image-side surface, the object-side surface faces towards an object side, the image-side surface faces towards an image side, the object-side surface is parallel with the image-side surface. The at least one anti-reflection layer is disposed on the object-side surface of the substrate, the at least one anti-reflection layer includes a nanocrystal structure layer and an optical-connecting layer, wherein the nanocrystal structure layer includes a metal oxide crystal, the optical-connecting layer connects the substrate and the nanocrystal structure layer, and the nanocrystal structure layer is physically contacted with the optical-connecting layer. When a material refractive index of the nanocrystal structure layer is Nc, a material refractive index of the optical-connecting layer is Nf, a height of the nanocrystal structure layer is Hc, a thickness of the optical-connecting layer is Hf, and a total height of the anti-reflection layer is H, the following conditions are satisfied: $Nf<Nc$; $Hf+Hc=H$; and $Hf<Hc$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
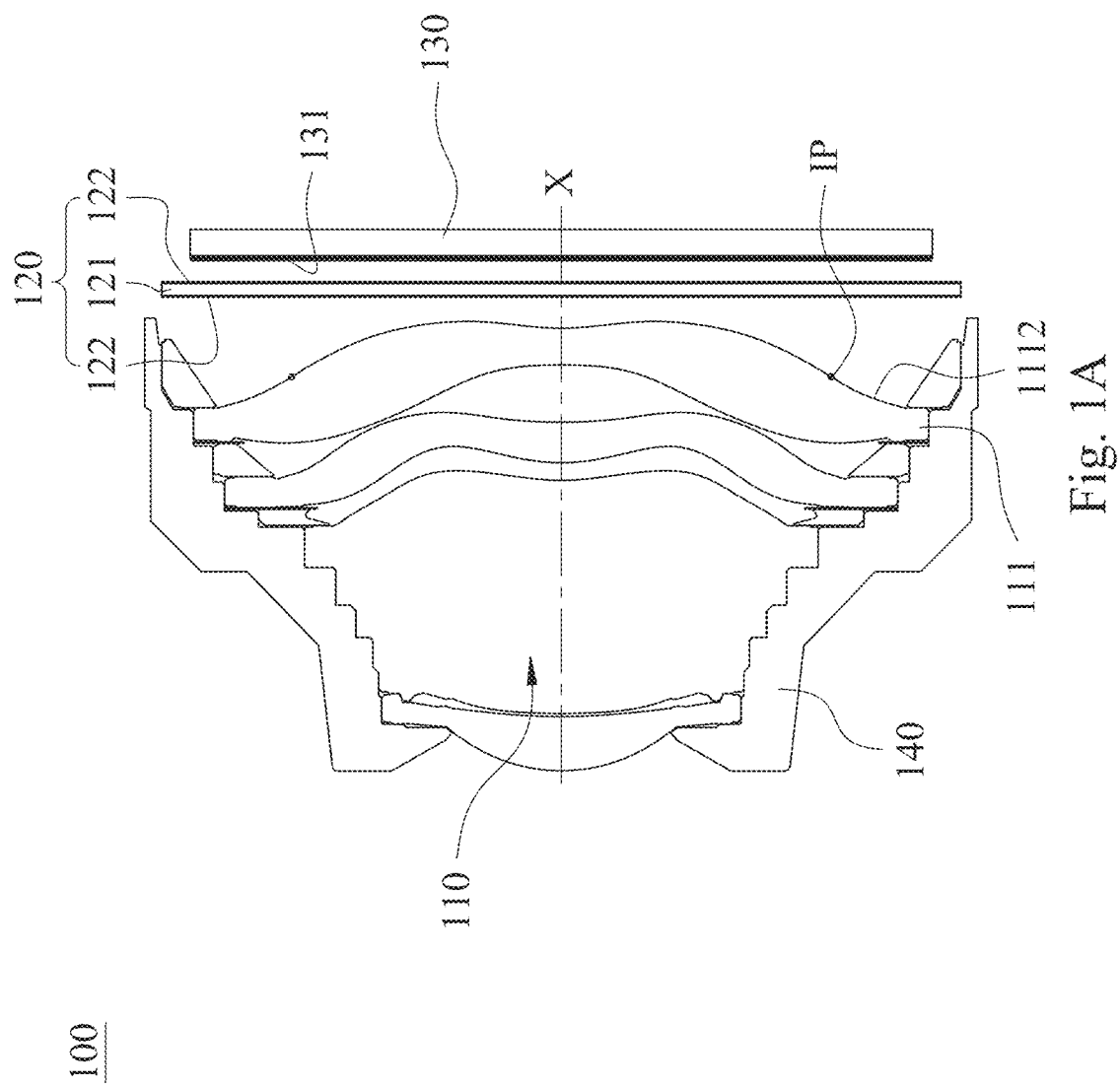
FIG. 1A is a schematic view of a camera module according to the 1st embodiment of the present disclosure.

The present disclosure provides a camera module which includes an imaging lens assembly, an image sensor and an optical plate. The image sensor is disposed on an image surface of the imaging lens assembly. The optical plate is disposed between the imaging lens assembly and the image sensor, and includes a substrate and at least one anti-reflection layer. The substrate has an object-side surface and an image-side surface, the object-side surface faces towards an object side, the image-side surface faces towards an image side, and the object-side surface is parallel with the image-side surface. The anti-reflection layer is disposed on the object-side surface or the image-side surface of the substrate and includes a nanocrystal structure layer and an optical-connecting layer. The nanocrystal structure layer includes a metal oxide crystal. The optical-connecting layer connects the substrate and the nanocrystal structure layer, and the nanocrystal structure layer is physically contacted with the optical-connecting layer. When a material refractive index of the nanocrystal structure layer is Nc, a material refractive index of the optical-connecting layer is Nf, a height of the nanocrystal structure layer is Hc, a thickness of the optical-connecting layer is Hf, and a total height of the anti-reflection layer is H, the following conditions are satisfied: Nf<Nc; Hf+Hc=H; and Hf<Hc. Therefore, it is favorable for reducing the stray lights of the camera module by disposing the anti-reflection layer on the optical plate so as to enhance the image quality. Further, it is favorable for enhancing the transmittance of the optical plate by using the nanocrystal structure layer with higher material refractive index as an outer layer of the optical plate so as to reduce the reflective lights of the optical plate. Moreover, it will be easier for the nanocrystal structure layer to deposit on the optical plate by the arrangement of the optical-connecting layer.

In the present disclosure, the material refractive index represents the material refractive index of the material which is presented in the form of an optical flat layer. Further, when the material is formed into a layer of a nanocrystal structure, part of the volume of the layer will be substituted by the air due to the shape of the nanocrystal structure, and an equivalent material refractive index of the entire layer will change in the direction of 1.00 according to the density of the nanocrystal structure.

During the manufacturing process, it is favorable for enhancing the structural stability of the anti-reflection layer by plating the optical-connecting layer on the substrate first, and then plating the nanocrystal structure layer. There is no gap between the upper side of the optical-connecting layer and the bottom side of the nanocrystal structure layer, and both of the layers are connected tightly. The nanocrystal structure layer is not formed as a complete plane. Therefore, it is favorable for contacting parts of the optical-connecting layer with the air.

A number of the anti-reflection layer can be two, and the anti-reflection layers are disposed on the object-side surface and the image-side surface of the substrate, respectively. By using the double-sided coating technology, both of the object-side surface and the image-side surface of the optical plate are coated with the anti-reflection layer, so that the reflective lights of the optical plate can be more effectively reduced.

In detail, the optical plate can be an infrared light filter (IR filter), a blue glass (BG), a polarizer, a liquid crystal display (LCD) panel, a neutral density filter (ND filter) and a Fresnel lens. When the optical plate is the polarizer, it is favorable for obtaining the function of light filtering by absorbing the light with specific electric field directions. When the optical plate is the IR filter, it is favorable for filtering the infrared light.

An image-side optical surface of the imaging lens assembly can be an optical aspheric surface, and the optical aspheric surface has at least one inflection point. Therefore, it is favorable for providing the imaging lens assembly with higher optical specification.

When the thickness of the optical-connecting layer is Hf, the following condition is satisfied: 20 nm<Hf<120 nm. Therefore, it is favorable for enhancing the plating yield rate of the nanocrystal structure layer and enhancing the optical transmittance by arranging the optical-connecting layer with specific thickness range. Further, the following condition can be satisfied: 40 nm<Hf<90 nm. Therefore, it is favorable for providing the thickness range with better uniformity.

When the material refractive index of the nanocrystal structure layer is Nc, and a material refractive index of the substrate is Ns, the following condition is satisfied: Ns<Nc. Therefore, it is favorable for reducing the secondary reflection in the optical plate by cooperating the substrate with low material refractive index with the nanocrystal structure layer with high material refractive index.

When the height of the nanocrystal structure layer is Hc, the following condition is satisfied: 120 nm<Hc<350 nm. Therefore, it is favorable for enhancing a height range of the transmittance by cooperating the nanocrystal structure layer with the optical-connecting layer. Further, the following condition can be satisfied: 150 nm<Hc<300 nm. Therefore, it is favorable for providing a nanocrystal with evener size and also providing higher coating quality.

The nanocrystal structure layer can be arranged irregularly, which can be a non-periodic arrangement. Therefore, it is favorable for avoiding the optical diffraction generated from the nanocrystal structure layer by the non-periodic arrangement, so that the actual light path of the imaging light can further meet the predetermined light path.

The substrate of the optical plate can be a glass substrate. Therefore, it is easier for the mass production.

The imaging lens assembly can be a main lens assembly, a telephoto lens assembly or a wide angle lens assembly. The camera module can be a vehicle camera module, a portable device camera module or a head-mounted device camera module, but is not limited thereto.

Each of the aforementioned features of the camera module can be combined with each other and reach the corresponded effect.

The present disclosure provides an electronic device which includes the aforementioned camera module. Therefore, it is favorable for enhancing the image quality.

According to the aforementioned embodiment, specific examples with figures are provided as follows.

1st Embodiment

Figure 1B:
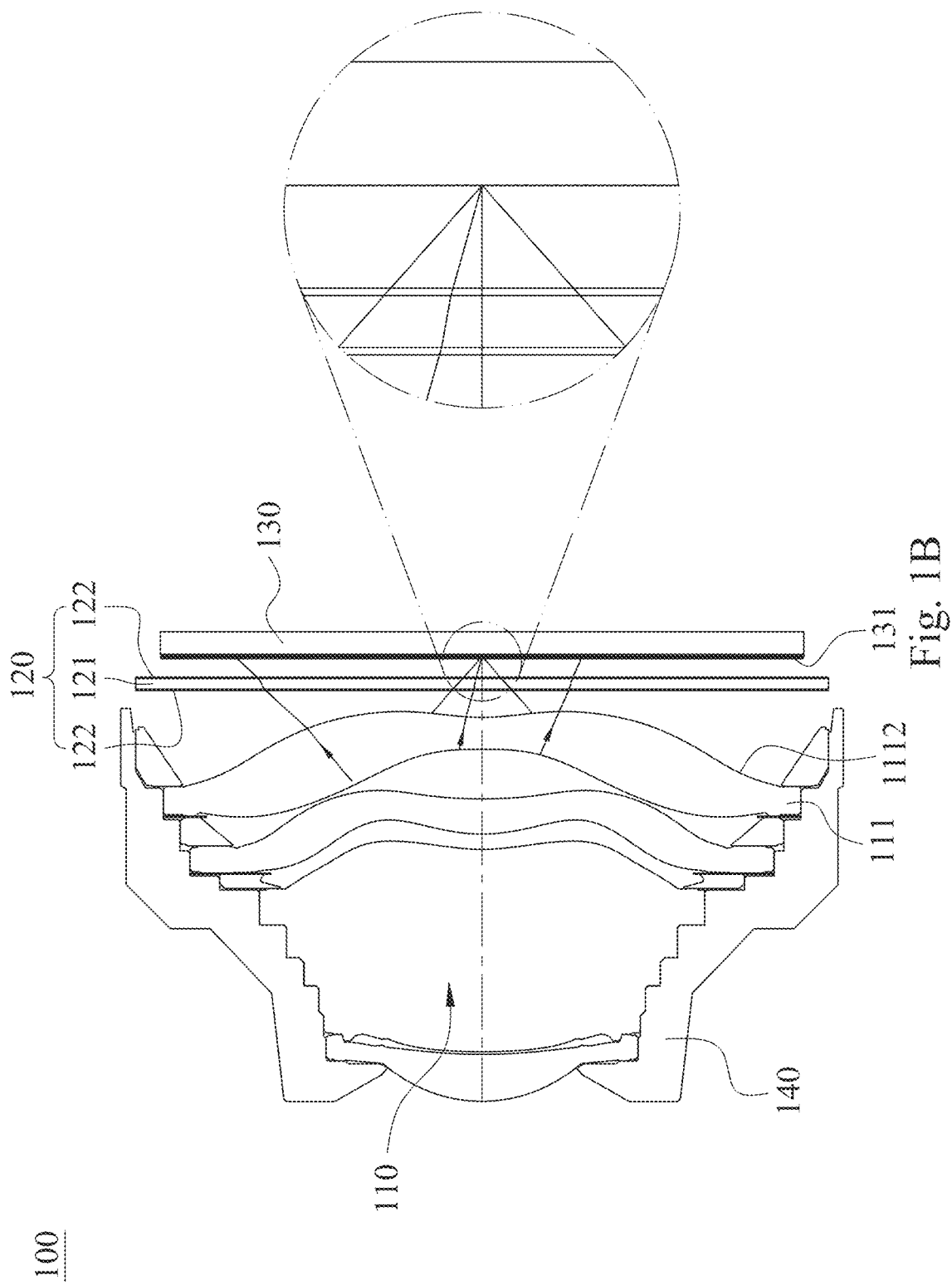
FIG. 1B shows a part of the light paths of the camera module according to FIG. 1A of the 1st embodiment.

FIG. 1A is a schematic view of a camera module 100 according to the 1st embodiment of the present disclosure. FIG. 1B shows a part of the light paths of the camera module 100 according to FIG. 1A of the 1st embodiment. In FIG. 1A, the camera module 100 includes an imaging lens assembly 110, an optical plate 120, and an image sensor 130. The camera module 100 includes, in order from an object side to an image side along an optical axis X, the imaging lens assembly 110, the optical plate 120, and the image sensor 130. The image sensor 130 is disposed on an image surface 131 of the imaging lens assembly 110. The optical plate 120 is disposed between the imaging lens assembly 110 and the image sensor 130. Therefore, as shown in FIG. 1B, it is favorable for reducing the reflectivity by the arrangement of the optical plate 120 so as to reduce the stray light.

The imaging lens assembly 110 can be disposed in a lens barrel 140 and include a plurality of lens elements. The lens element which is closest to the image side of the camera module 100 is a most image side lens element 111, and an image-side surface of the most image side lens element 111 is an image-side optical surface 1112 of the imaging lens assembly 110. The image-side optical surface 1112 is an optical aspheric surface, and the optical aspheric surface has at least one inflection point IP. Further, other optical elements can be disposed in the lens barrel 140 according to specific requirements, for example, a light blocking sheet, a spacer, a retainer, etc., and will not be described herein.

Figure 1C:
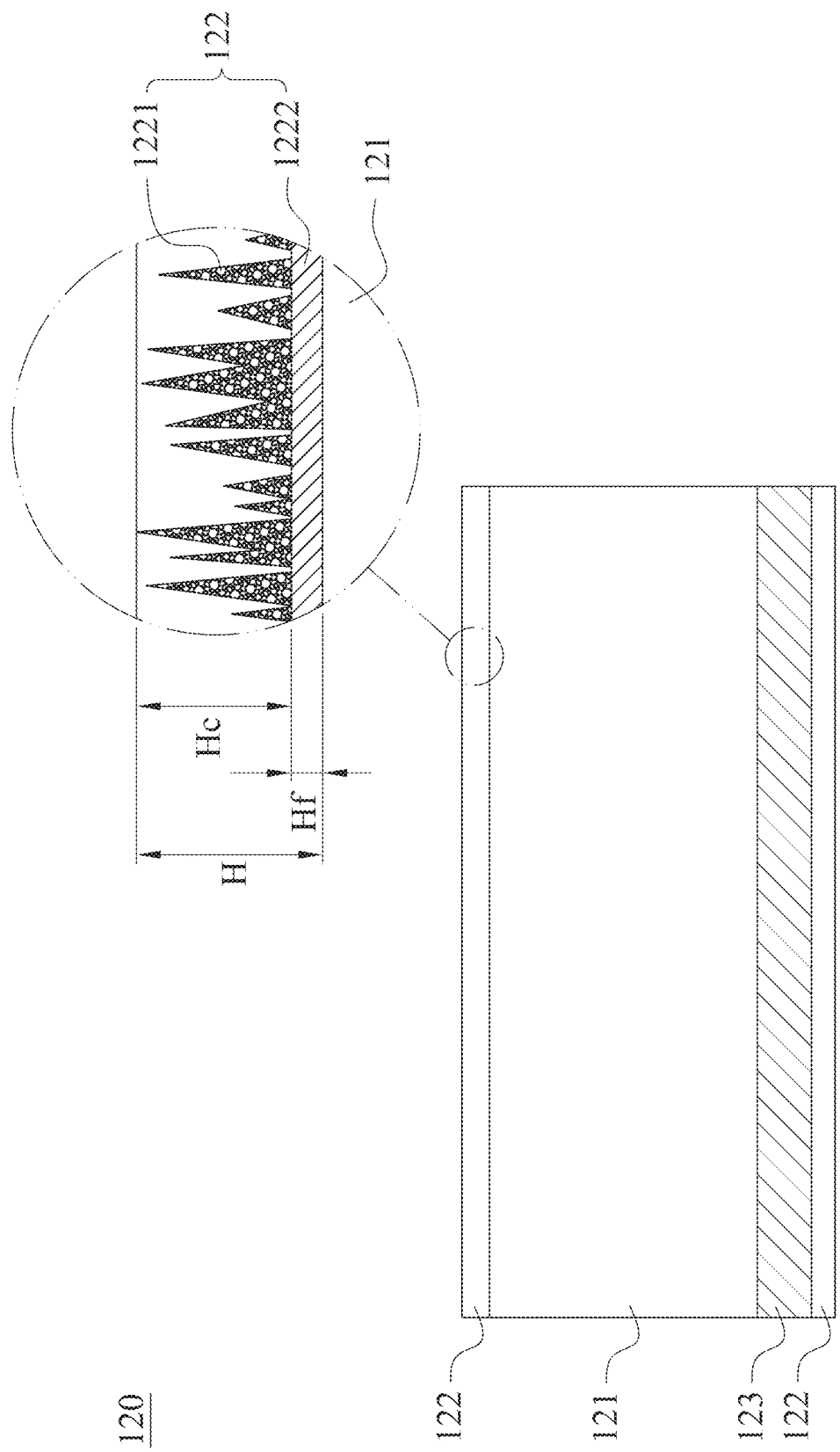
FIG. 1C is a schematic view of the optical plate according to the 1st example of the 1st embodiment of the present disclosure.

The optical plate 120 includes a substrate 121 and at least one anti-reflection layer 122. The substrate 121 has an object-side surface and an image-side surface. The object-side surface faces towards an object side, the image-side surface faces towards an image side, and the object-side surface is parallel with the image-side surface. The anti-reflection layer 122 is disposed on at least one of the object-side surface and the image-side surface of the substrate 121. FIG. 1C is a schematic view of the optical plate 120 according to the 1st example of the 1st embodiment of the present disclosure. In FIG. 1A and FIG. 1C, a number of the anti-reflection layer 122 is two, which are disposed on the object-side surface and the image-side surface of the substrate 121, respectively. Each anti-reflection layer 122 includes a nanocrystal structure layer 1221 and an optical-connecting layer 1222.

In detail, in the 1st example of the 1st embodiment, the optical plate 120 can be an infrared filter which can further include an infrared filter layer 123. The infrared filter layer 123 is disposed between the image-side surface of the substrate 121 and the optical-connecting layer 1222 of the anti-reflection layer 122. In the anti-reflection layer 122 of the object-side surface of the substrate 121, the optical-connecting layer 1222 connects the substrate 121 and the nanocrystal structure layer 1221, and the nanocrystal structure layers 1221 of both sides of the substrate 121 are physically contacted with the optical-connecting layer 1222. The substrate 121 can be a glass substrate, each of the nanocrystal structure layers 1221 includes a metal oxide crystal, and the nanocrystal structure layers 1221 are arranged irregularly. The optical-connecting layers 1222 can be made of the silicon dioxide, the infrared filter layer 123 can absorb the infrared light and reflect the infrared light, but is not limited thereto.

In the 1st example of the 1st embodiment, when a material refractive index of the substrate 121 is Ns, a material refractive index of the nanocrystal structure layers 1221 is Nc, a material refractive index of the optical-connecting layers 1222 is Nf, a height of the nanocrystal structure layers 1221 is Hc, a thickness of the optical-connecting layers 1222 is Hf, and a total height of the anti-reflection layer 122 is H, the detailed optical data of the 1st example of the 1st embodiment are shown in Table 1.

TABLE 1

| 1st example of 1st embodiment | | | |
|---|---|---|---|
| Ns | 1.52 | Hc (nm) | 200.3 |
| Nf | 1.52 | Hf (nm) | 73.7 |
| Nc | 1.67 | H (nm) | 274.0 |

According to Table 1, the following conditions of the 1st example of the 1st embodiment are satisfied: Nf<Nc; Hf+Hc=H; Hf<Hc; and Ns<Nc. It should be noted that, other examples of the 1st embodiment are also satisfied with the aforementioned conditions, and the actual parameter values can be the same or different from Table 1, and will not describe in the following examples.

Figure 1D:
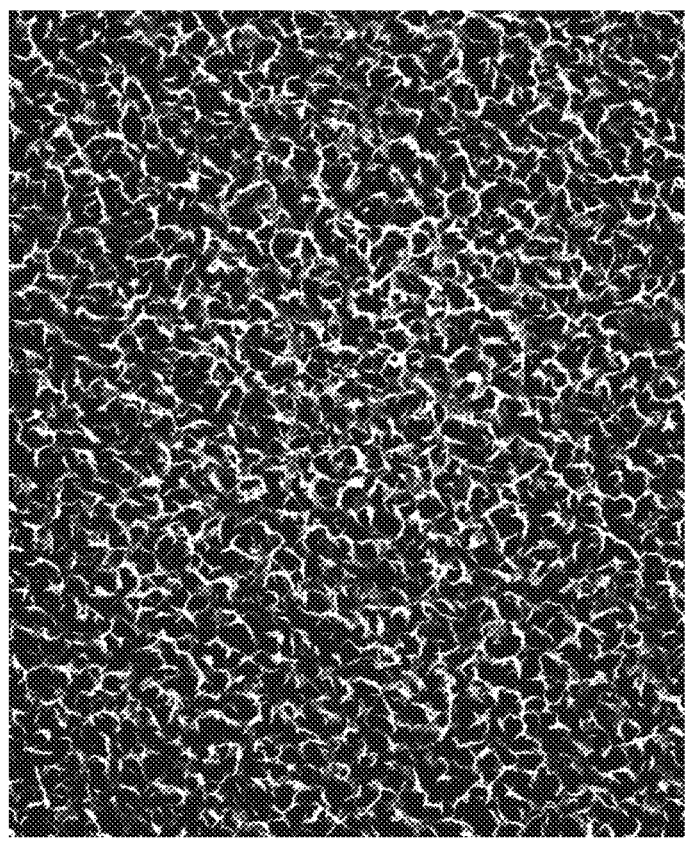
FIG. 1D shows an electron microscope picture of the nanocrystal structure layer on the optical plate in FIG. 1A.
Figure 1E:
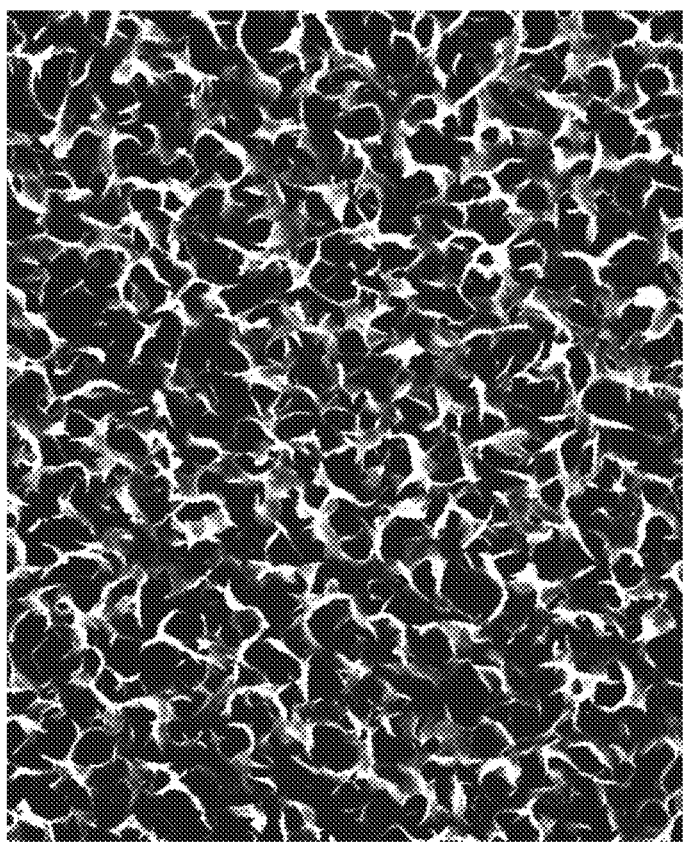
FIG. 1E shows another electron microscope picture of the nanocrystal structure layer on the optical plate in FIG. 1A.

FIG. 1D shows an electron microscope picture of the nanocrystal structure layer 1221 on the optical plate 120 in FIG. 1A, FIG. 1E shows another electron microscope picture of the nanocrystal structure layer 1221 on the optical plate 120 in FIG. 1A. In FIG. 1C, FIG. 1D and FIG. 1E, the nanocrystal structure layers 1221 are arranged irregularly. Therefore, it is favorable for avoiding the optical diffraction generated from the nanocrystal structure layers 1221 by the non-periodic arrangement, so that the actual light path of the imaging light can further meet the predetermined light path.

Figure 1F:
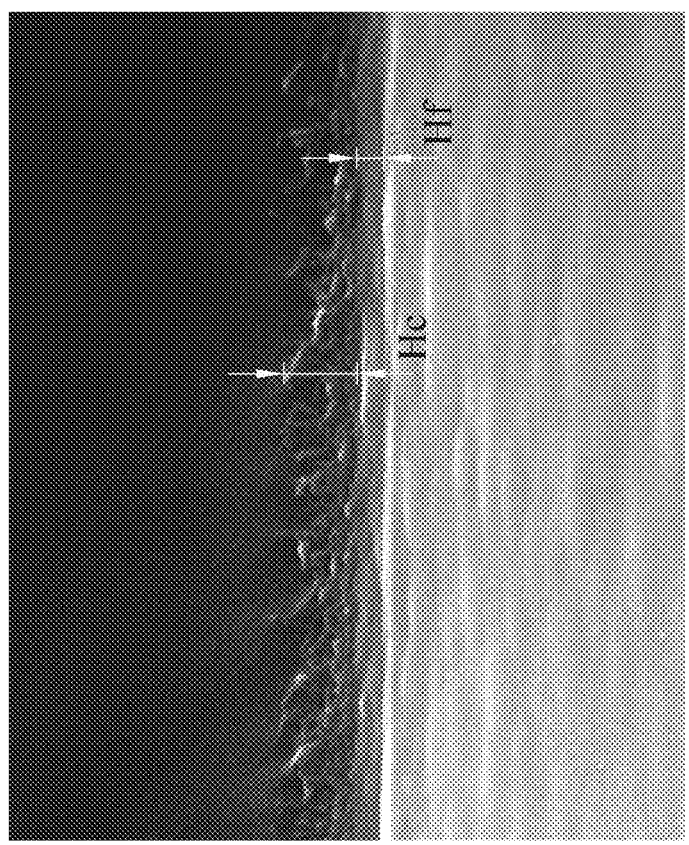
FIG. 1F shows an electron microscope picture of a cross-sectional view of the anti-reflection layer in FIG. 1A.
Figure 1G:
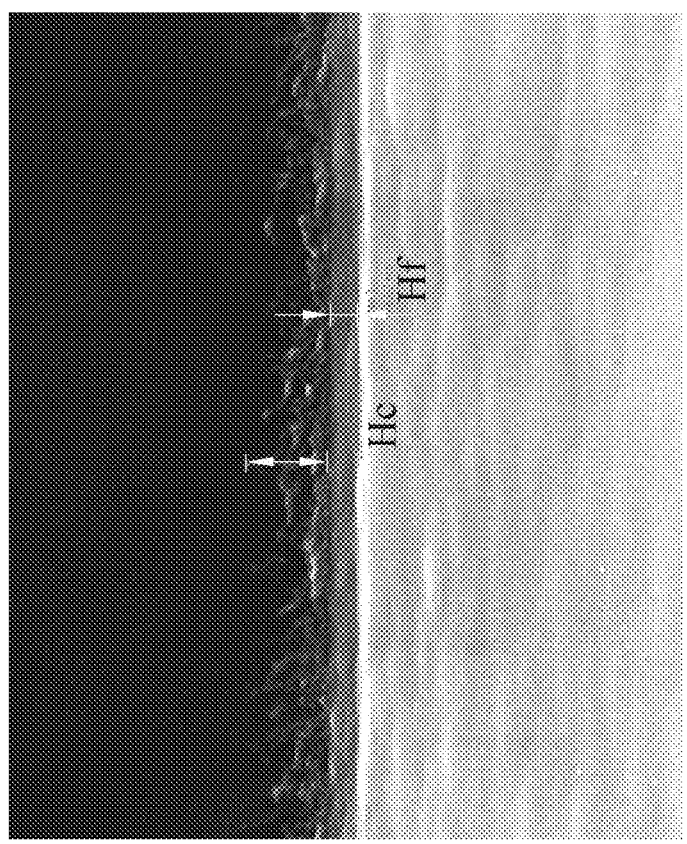
FIG. 1G shows another electron microscope picture of a cross-sectional view of the anti-reflection layer in FIG. 1A.

FIG. 1F shows an electron microscope picture of a cross-sectional view of the anti-reflection layer 122 in FIG. 1A, FIG. 1G shows another electron microscope picture of a cross-sectional view of the anti-reflection layer 122 in FIG. 1A. In FIG. 1F, when the height of the nanocrystal structure layers 1221 is Hc, and the thickness of the optical-connecting layers 1222 is Hf, the following conditions are satisfied: Hc=200.3 nm; and Hf=73.68 nm. In FIG. 1G, when the height of the nanocrystal structure layers 1221 is Hc, and the thickness of the optical-connecting layers 1222 is Hf, the following conditions are satisfied: Hc=232.7 nm; and Hf=76.62 nm. In FIG. 1C, FIG. 1F and FIG.1G, there is no gap between the upper side of the optical-connecting layer 1222 and the bottom side of the nanocrystal structure layer 1221, and both of the layers are connected tightly. The nanocrystal structure layers 1221 are not formed as a complete plane. Therefore, it is favorable for contacting parts of the upper side of the optical-connecting layers 1222 with the air. Furthermore, the optical-connecting layers 1222 are plated on the substrate 121 first, and then the nanocrystal structure layers 1221 are plated thereon. Therefore, the nanocrystal structure layers 1221 can be deposited on the optical plate 120 easier by disposing the optical-connecting layers 1222 so as to enhance the structural stability of the anti-reflection layer 122.

According to different requirements, different optical plates 120 in the 2nd, 3rd, 4th, 5th, 6th examples are provided herein. In order to clearly describe, the optical plates 120 and the corresponding elements in the 2nd, 3rd, 4th, 5th, 6th examples are labeled with the same numbers, other elements and arrangements thereof in the 2nd, 3rd, 4th, 5th, 6th examples are the same with the 1st example of the 1st embodiment, and will not be described again herein.

Figure 2:
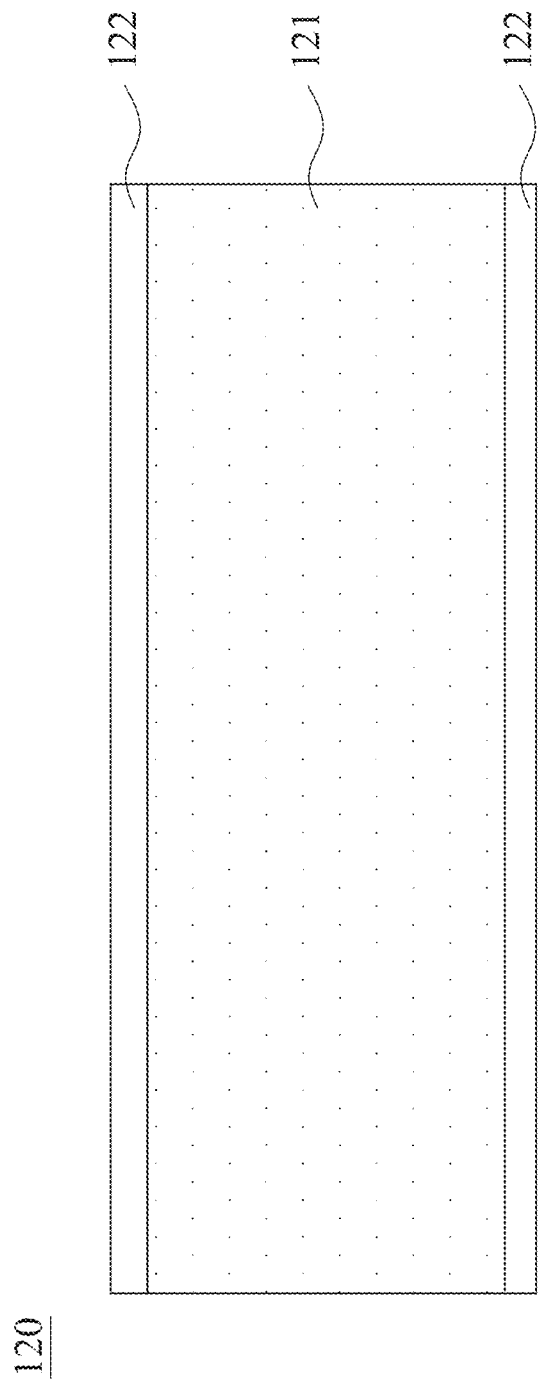
FIG. 2 is a schematic view of an optical plate according to the 2nd example of the 1st embodiment of FIG. 1A.

FIG. 2 is a schematic view of an optical plate 120 according to the 2nd example of the 1st embodiment of FIG. 1A. In FIG. 1A, FIG. 1C and FIG. 2, a number of the anti-reflection layer 122 is two, which are disposed on the object-side surface and the image-side surface of the substrate 121, respectively. Each anti-reflection layer 122 includes a nanocrystal structure layer 1221 and an optical-connecting layer 1222.

In detail, according to the 2nd example of FIG. 2, the substrate 121 can be a blue glass substrate which is favorable for absorbing the infrared light, and let the optical plate 120 being an infrared light filter. In the anti-reflection layers 122 of the object-side surface and the image-side surface of the substrate 121, the optical-connecting layers 1222 connect the substrate 121 and the nanocrystal structure layers 1221, and the nanocrystal structure layers 1221 of both sides of the substrate 121 are physically contacted with the optical-connecting layers 1222. Each of the nanocrystal structure layers 1221 includes a metal oxide crystal, and the nanocrystal structure layers 1221 are arranged irregularly. The optical-connecting layers 1222 can be made of the silicon dioxide.

Figure 3:
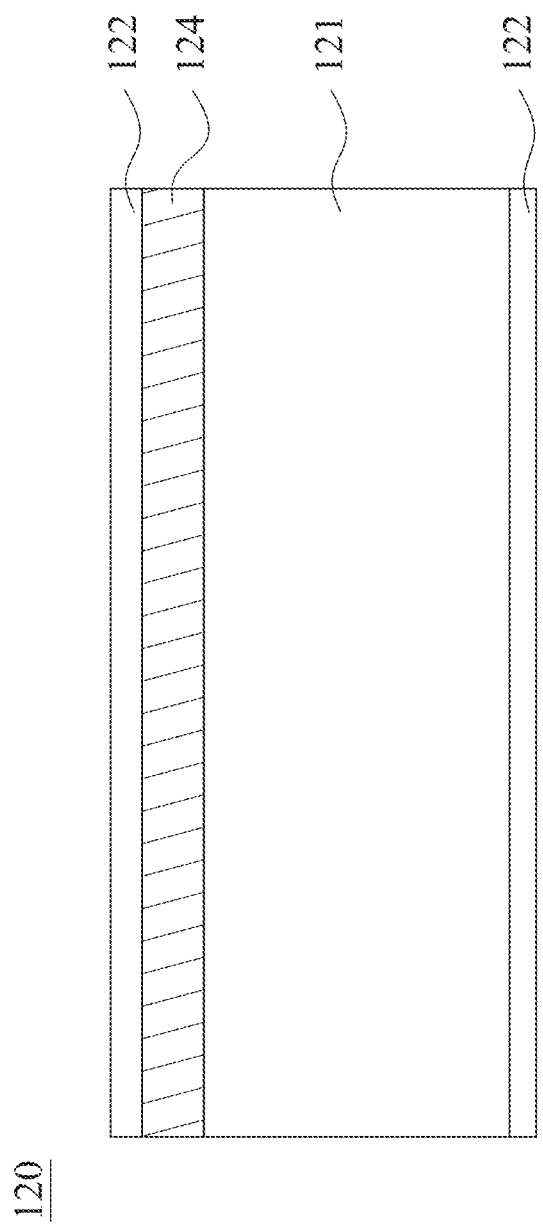
FIG. 3 is a schematic view of an optical plate according to the 3rd example of the 1st embodiment of FIG. 1A.

FIG. 3 is a schematic view of an optical plate 120 according to the 3rd example of the 1st embodiment of FIG. 1A. In FIG. 1A, FIG. 1C and FIG. 3, a number of the anti-reflection layer 122 is two which are disposed on the object-side surface and the image-side surface of the substrate 121, respectively. Each anti-reflection layer 122 includes a nanocrystal structure layer 1221 and an optical-connecting layer 1222.

In detail, according to the 3rd example of the 1st embodiment, the optical plate 120 can be a filter which can further include a polarizer layer 124. The polarizer layer 124 is disposed between the object-side surface of the substrate 121 and the optical-connecting layer 1222 of the anti-reflection layer 122. In the anti-reflection layer 122 of the image-side surface of the substrate 121, the optical-connecting layer 1222 connects the substrate 121 and the nanocrystal structure layer 1221, and the nanocrystal structure layers 1221 of both sides of the substrate 121 are physically contacted with the optical-connecting layers 1222. The substrate 121 can be a glass substrate, each of the nanocrystal structure layers 1221 includes a metal oxide crystal, and the nanocrystal structure layers 1221 are arranged irregularly. The optical-connecting layers 1222 can be made of the silicon dioxide, the polarizer layer 124 can obtain the function of light filtering by absorbing the lights with specific electric field directions so as to filter the light, but is not limited thereto.

Figure 4:
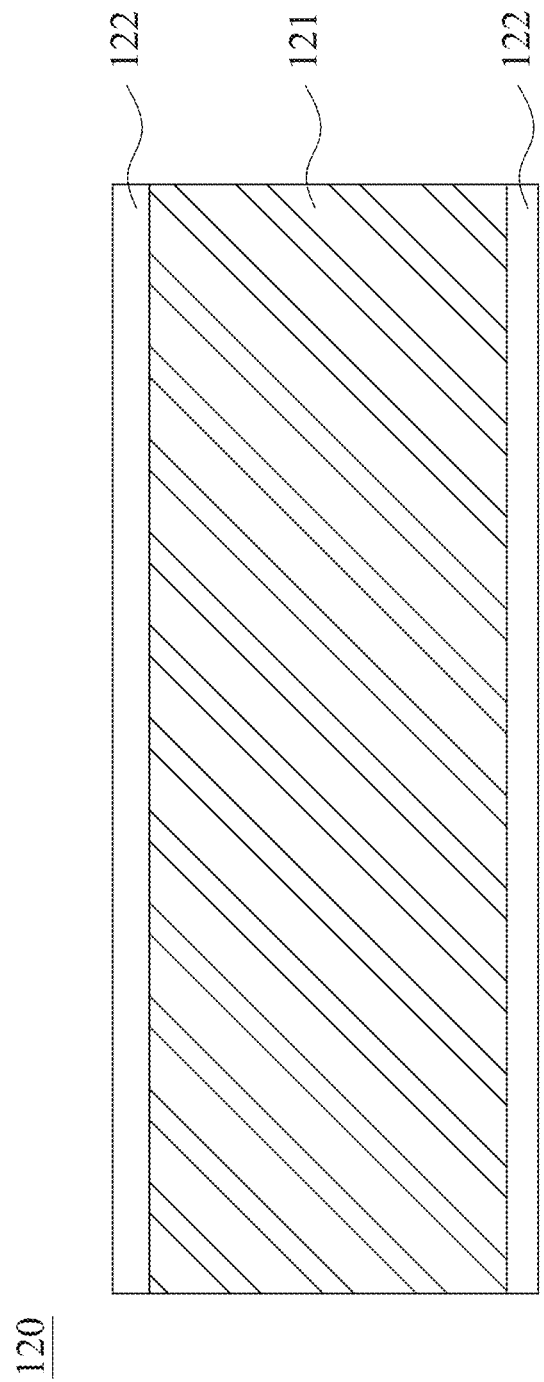
FIG. 4 is a schematic view of an optical plate according to the 4th example of the 1st embodiment of FIG. 1A.

FIG. 4 is a schematic view of an optical plate 120 according to the 4th example of the 1st embodiment of FIG. 1A. In FIG. 1A, FIG. 1C and FIG. 4, a number of the anti-reflection layer 122 is two which are disposed on the object-side surface and the image-side surface of the substrate 121, respectively. Each anti-reflection layer 122 includes a nanocrystal structure layer 1221 and an optical-connecting layer 1222.

In detail, according to the 4th example of the 1st embodiment, the substrate 121 can be a ND filter which is favorable for absorbing the light in specific proportion, and let the optical plate 120 being a filter which can absorb the light in specific proportion. In the anti-reflection layers 122 of the object-side surface and the image-side surface of the substrate 121, the optical-connecting layers 1222 connect the substrate 121 and the nanocrystal structure layers 1221, and the nanocrystal structure layers 1221 of both sides of the substrate 121 are physically contacted with the optical-connecting layers 1222. Each of the nanocrystal structure layers 1221 includes a metal oxide crystal, and the nanocrystal structure layers 1221 are arranged irregularly. The optical-connecting layers 1222 can be made of the silicon dioxide.

Figure 5:
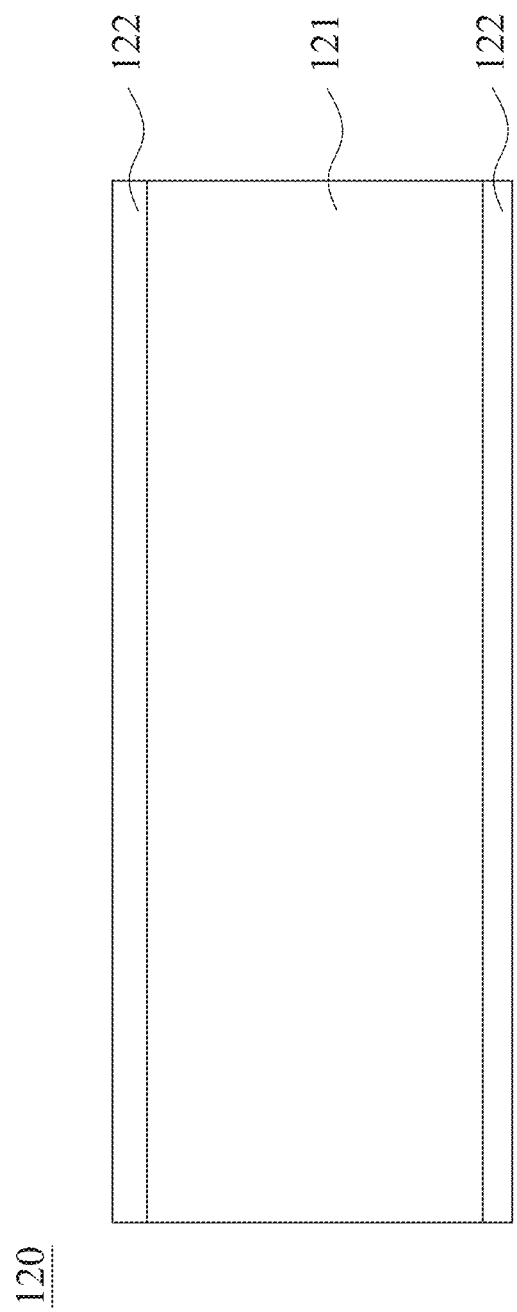
FIG. 5 is a schematic view of an optical plate according to the 5th example of the 1st embodiment of FIG. 1A.

FIG. 5 is a schematic view of an optical plate 120 according to the 5th example of the 1st embodiment of FIG. 1A. In FIG. 1A, FIG. 1C and FIG. 5, a number of the anti-reflection layer 122 is two which are disposed on the object-side surface and the image-side surface of the substrate 121, respectively. Each anti-reflection layer 122 includes a nanocrystal structure layer 1221 and an optical-connecting layer 1222.

In detail, according to the 5th example of the 1st embodiment, the substrate 121 can be a liquid crystal layer. Therefore, it is favorable for the liquid crystal layer to filter or transmit the light in specific electric field directions by tuning the voltage, and let the optical plate 120 be a filter. In the anti-reflection layers 122 of the object-side surface and the image-side surface of the substrate 121, the optical-connecting layers 1222 connect the substrate 121 and the nanocrystal structure layers 1221, and the nanocrystal structure layers 1221 of both sides of the substrate 121 are physically contacted with the optical-connecting layers 1222. Each of the nanocrystal structure layers 1221 includes a metal oxide crystal, and the nanocrystal structure layers 1221 are arranged irregularly. The optical-connecting layers 1222 can be made of the silicon dioxide.

Figure 6:
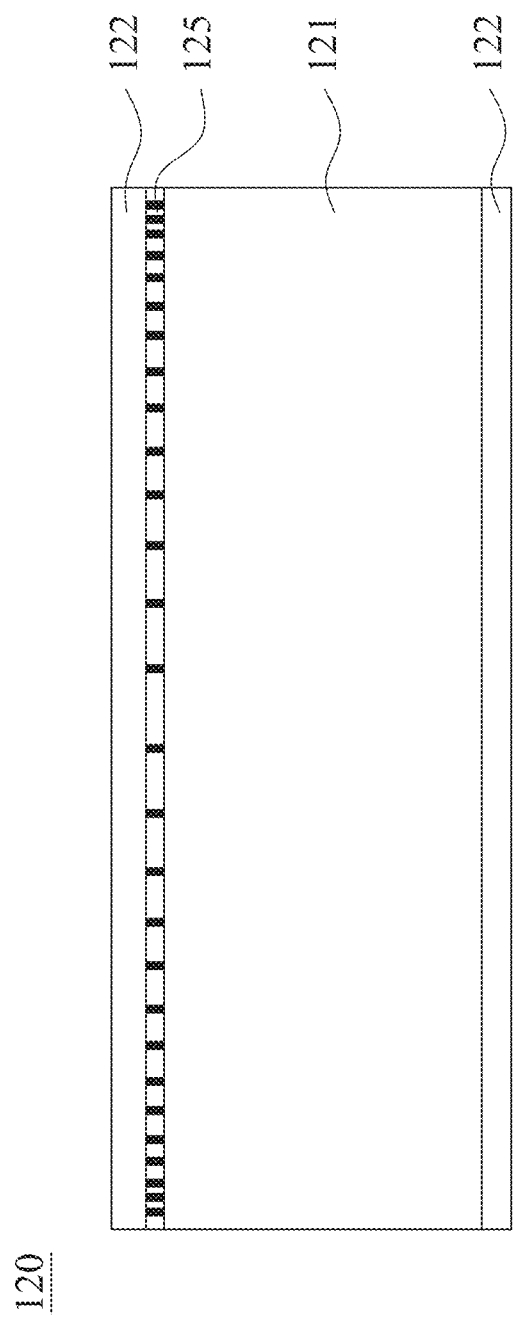
FIG. 6 is a schematic view of an optical plate according to the 6th example of the 1st embodiment of FIG. 1A.

FIG. 6 is a schematic view of an optical plate 120 according to the 6th example of the 1st embodiment of FIG. 1A. In FIG. 1A, FIG. 1C and FIG. 6, a number of the anti-reflection layer 122 is two which are disposed on the object-side surface and the image-side surface of the substrate 121, respectively. Each anti-reflection layer 122 includes a nanocrystal structure layer 1221 and an optical-connecting layer 1222.

In detail, according to the 6th example of the 1st embodiment, the optical plate 120 can be a filter which can further include a Fresnel lens 125. The Fresnel lens 125 is disposed between the object-side surface of the substrate 121 and the optical-connecting layer 1222 of the anti-reflection layer 122. In the anti-reflection layer 122 of the image-side surface of the substrate 121, the optical-connecting layer 1222 connects the substrate 121 and the nanocrystal structure layer 1221, and the nanocrystal structure layers 1221 of both sides of the substrate 121 are physically contacted with the optical-connecting layer 1222. The substrate 121 can be a glass substrate, each of the nanocrystal structure layers 1221 includes a metal oxide crystal, and the nanocrystal structure layers 1221 are arranged irregularly. The optical-connecting layers 1222 can be made of the silicon dioxide, and the Fresnel lens 125 is favorable for adjusting the angle of the light, but is not limited thereto.

2nd Embodiment

Figure 7:
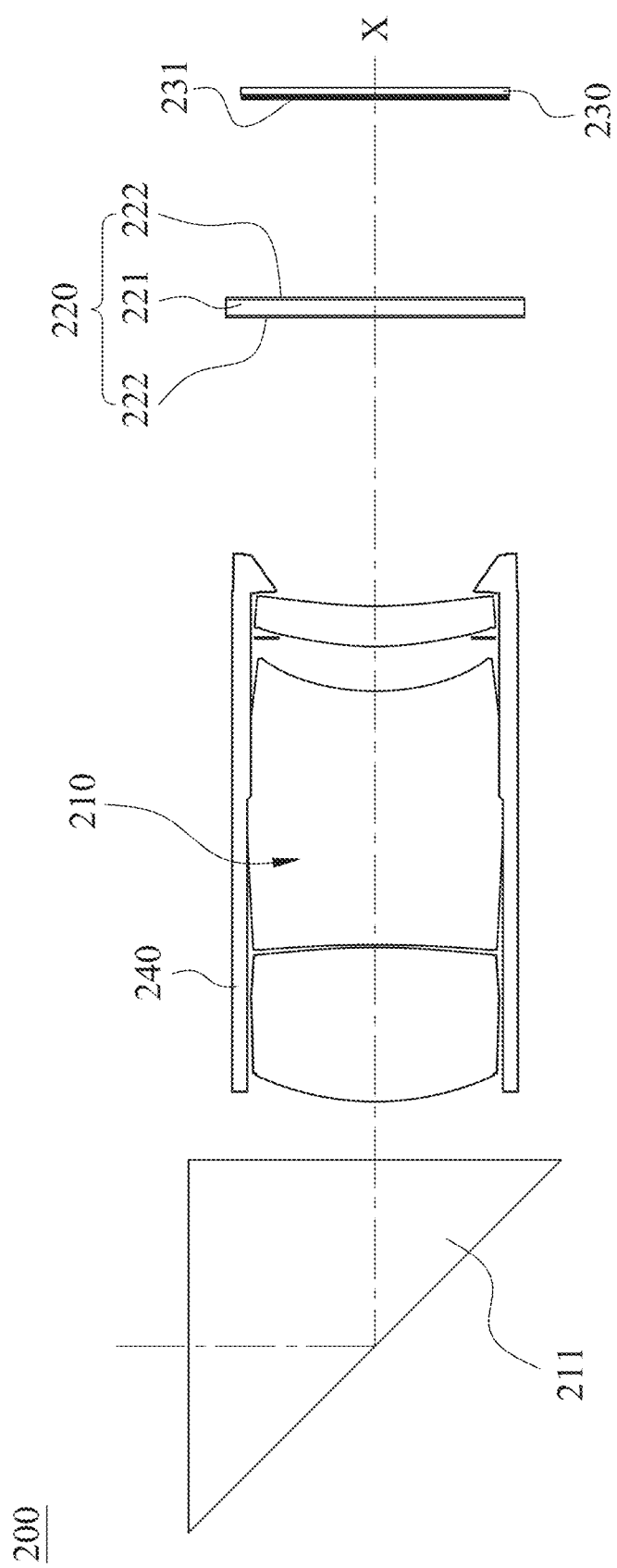
FIG. 7 is a schematic view of a camera module according to the 2nd embodiment of the present disclosure.

FIG. 7 is a schematic view of a camera module 200 according to the 2nd embodiment of the present disclosure. In FIG. 7, the camera module 200 includes an imaging lens assembly 210, an optical plate 220, and an image sensor 230. The camera module 200 includes, in order from an object side to an image side along an optical axis X, the imaging lens assembly 210, the optical plate 220, and the image sensor 230. The image sensor 230 is disposed on an image surface 231 of the imaging lens assembly 210. The optical plate 220 is disposed between the imaging lens assembly 210 and the image sensor 230. Therefore, it is favorable for reducing the reflectivity by disposing the optical plate 220 so as to reduce the stray light.

The camera module 200 can further include a light path folding element 211 which is disposed on a most object side of the imaging lens assembly 210. Therefore, it is favorable for adjusting the light path and let the lights entering the image sensor 230 along the optical axis X.

The imaging lens assembly 210 can be disposed in a lens barrel 240 and include a plurality of lens elements. Further, other optical elements can be disposed in the lens barrel 240 according to specific requirements, for example, a light blocking sheet, a spacer, a retainer, etc., and will not be described herein.

The optical plate 220 includes a substrate 221 and at least one anti-reflection layer 222. The substrate 221 has an object-side surface and an image-side surface. The object-side surface faces towards an object side, the image-side surface faces towards an image side, and the object-side surface is parallel with the image-side surface. The anti-reflection layer 222 is disposed on at least one of the object-side surface and the image-side surface of the substrate 221. In the 2nd embodiment, a number of the anti-reflection layer 222 is two which are disposed on the object-side surface and the image-side surface of the substrate 221, respectively.

The optical plate 220 of the camera module 200 in the 2nd embodiment can be any optical plate in the 1st, 2nd, 3rd, 4th, 5th, 6th examples of the 1st embodiment according to different requirements, but is not limited thereto.

In the 1st example of the 2nd embodiment, when a material refractive index of the substrate 221 is Ns, a material refractive index of the nanocrystal structure layer is Nc, a material refractive index of the optical-connecting layer is Nf, a height of the nanocrystal structure layer is Hc, a thickness of the optical-connecting layer is Hf, and a total height of the anti-reflection layers 222 is H, the detailed optical data of the 1st example of the 2nd embodiment are shown in Table 2.

TABLE 2

| 1st example of 2nd embodiment | | | |
|---|---|---|---|
| Ns | 1.54 | Hc (nm) | 232.7 |
| Nf | 1.52 | Hf (nm) | 76.6 |
| Nc | 1.67 | H (nm) | 309.3 |

According to Table 2, the following conditions of the 1st example of the 2nd embodiment can be satisfied: Nf<Nc; Hf+Hc=H; Hf<Hc; and Ns<Nc.

3rd Embodiment

Figure 8:
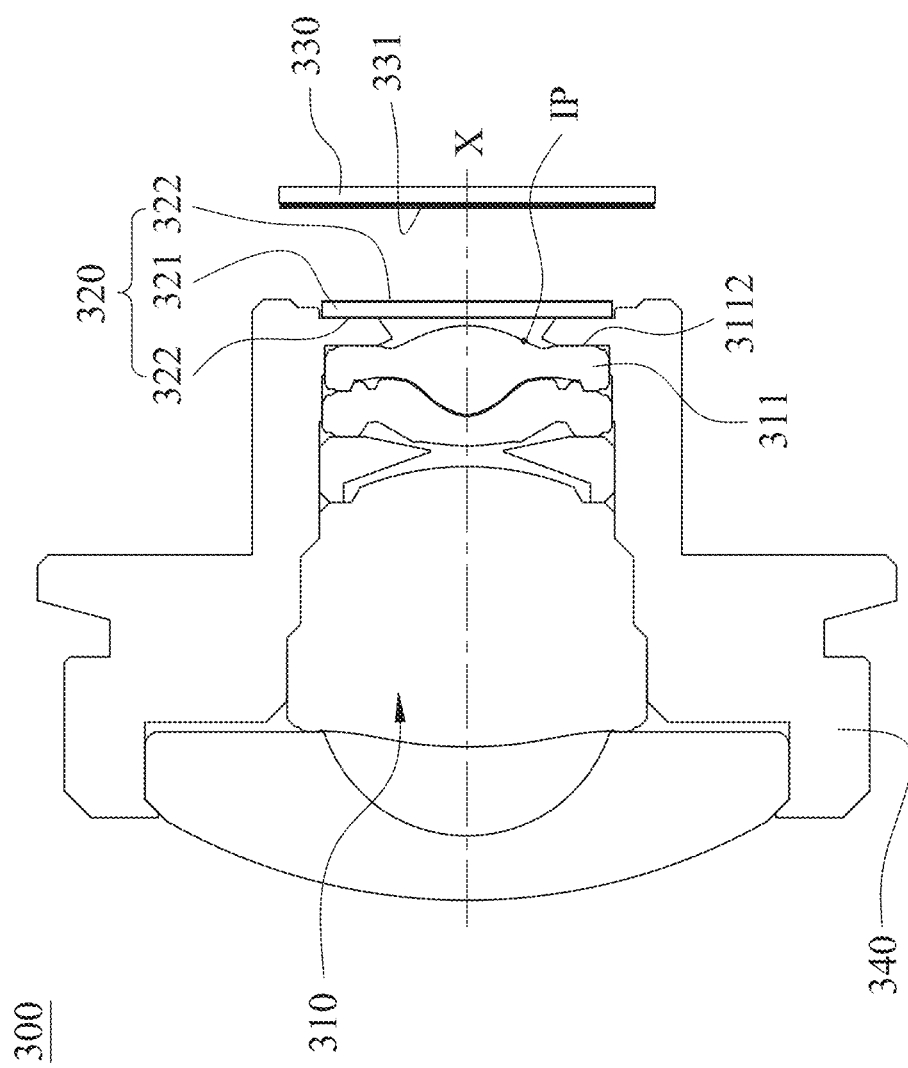
FIG. 8 is a schematic view of a camera module according to the 3rd embodiment of the present disclosure.

FIG. 8 is a schematic view of a camera module 300 according to the 3rd embodiment of the present disclosure. In FIG. 8, the camera module 300 includes an imaging lens assembly 310, an optical plate 320, and an image sensor 330. The camera module 300 includes, in order from an object side to an image side along an optical axis X, the imaging lens assembly 310, the optical plate 320, and the image sensor 330. The image sensor 330 is disposed on an image surface 331 of the imaging lens assembly 310. The optical plate 320 is disposed between the imaging lens assembly 310 and the image sensor 330. Therefore, it is favorable for reducing the reflectivity by disposing the optical plate 320 so as to reduce the stray light.

The imaging lens assembly 310 can be disposed in a lens barrel 340 and include a plurality of lens elements. The lens elements are disposed in order from the object side to the image side along the optical axis X of the camera module 300. The lens element which closest to the image side of the camera module 300 is a most image side lens element 311, and an image-side surface of the most image side lens element 311 is an image-side optical surface 3112 of the imaging lens assembly 310. The image-side optical surface 3112 is an optical aspheric surface, and the optical aspheric surface has at least one inflection point IP. Further, other optical elements can be disposed in the lens barrel 340 according to specific requirements, for example, a light blocking sheet, a spacer, a retainer, etc., and will not be described herein.

The optical plate 320 is disposed on an image side of the lens barrel 340, and the optical plate 320 can be disposed on an image-side surface of the lens barrel 340. The optical plate 320 includes a substrate 321 and at least one anti-reflection layer 322. The substrate 321 has an object-side surface and an image-side surface. The object-side surface faces towards an object side, the image-side surface faces towards an image side, and the object-side surface is parallel with the image-side surface. The anti-reflection layer 322 is disposed on at least one of the object-side surface and the image-side surface of the substrate 321. In the 3rd embodiment, a number of the anti-reflection layer 322 is two which are disposed on the object-side surface and the image-side surface of the substrate 321, respectively.

The optical plate 320 of the camera module 300 in the 3rd embodiment can be any optical plate in the 1st, 2nd, 3rd, 4th, 5th, 6th examples of the 1st embodiment according to different requirements, but is not limited thereto.

In the 1st example of the 3rd embodiment, when a material refractive index of the substrate 321 is Ns, a material refractive index of the nanocrystal structure layer is Nc, a material refractive index of the optical-connecting layer is Nf, a height of the nanocrystal structure layer is Hc, a thickness of the optical-connecting layer is Hf, and a total height of the anti-reflection layers 322 is H, the detailed optical data of the 1st example of the 3rd embodiment are shown in Table 3.

TABLE 3

| 1st example of 3rd embodiment | | | |
|---|---|---|---|
| Ns | 1.52 | Hc (nm) | 200.3 |
| Nf | 1.52 | Hf (nm) | 73.7 |
| Nc | 1.67 | H (nm) | 274.0 |

According to Table 3, the following conditions of the 1st example of the 3rd embodiment can be satisfied: Nf<Nc; Hf+Hc=H; Hf<Hc; and Ns<Nc.

4th Embodiment

Figure 9A:
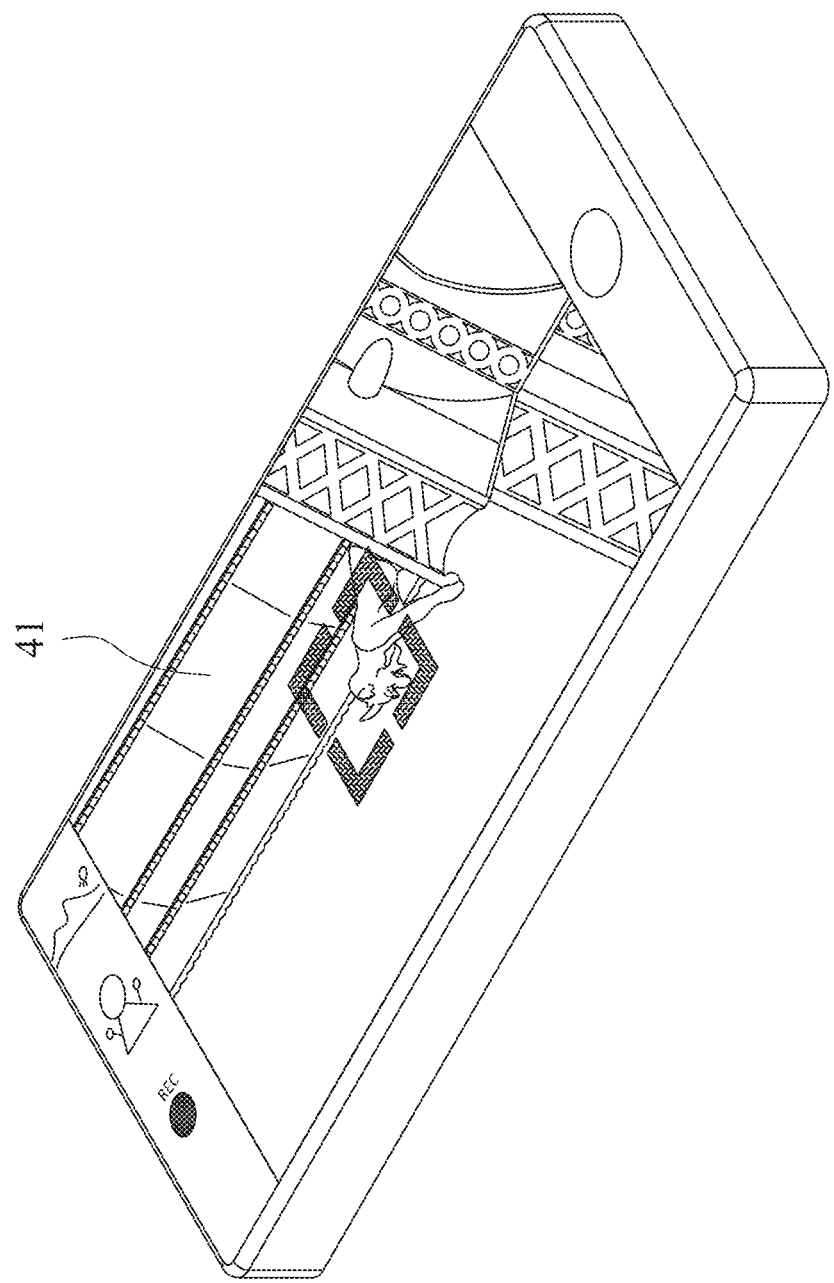
FIG. 9A is a schematic view of an electronic device according to the 4th embodiment of the present disclosure.

FIG. 9A is a schematic view of an electronic device 40 according to the 4th embodiment of the present disclosure.

Figure 9B:
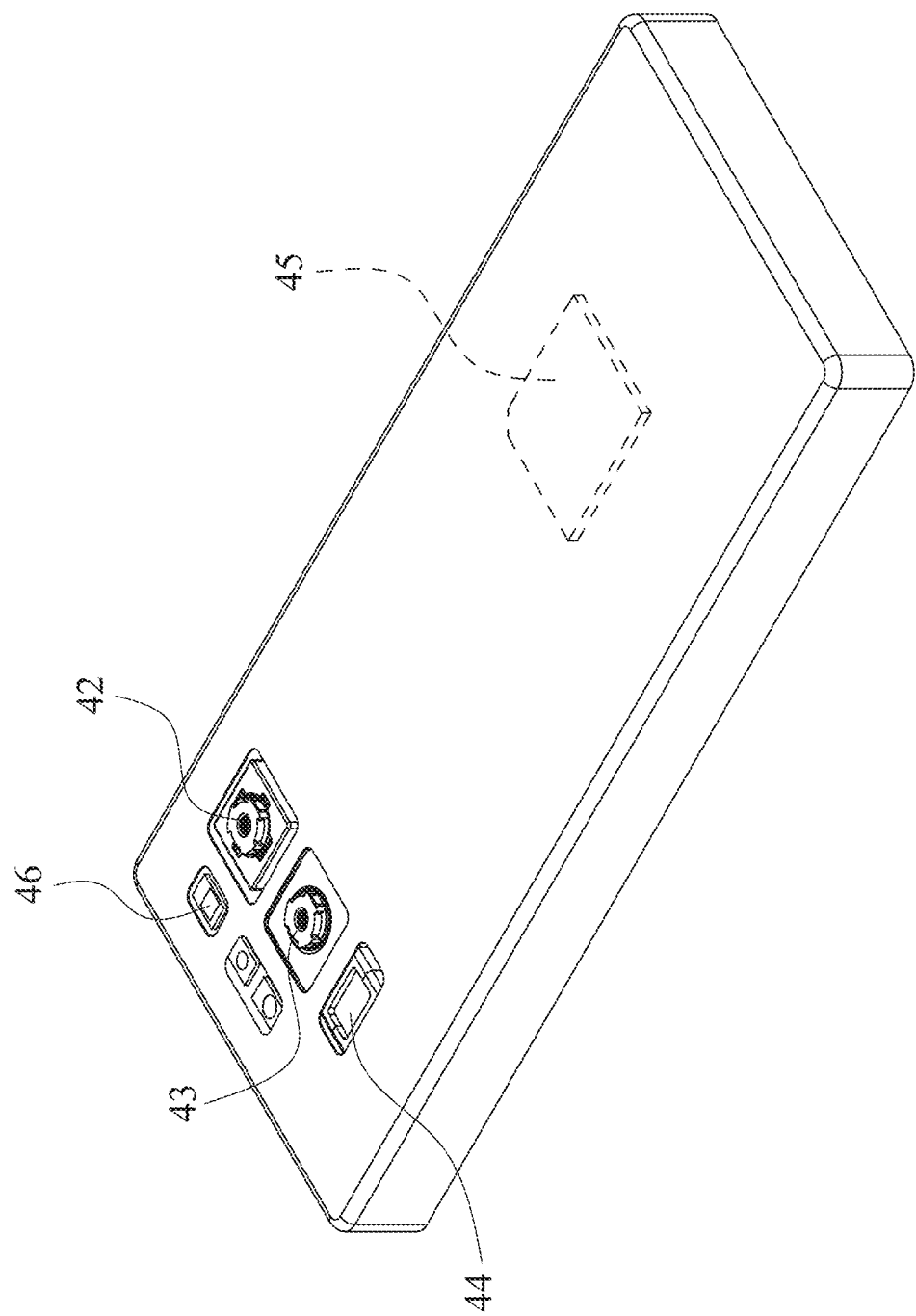
FIG. 9B is another schematic view of the electronic device according to the 4th embodiment of the present disclosure.

FIG. 9B is another schematic view of the electronic device 40 according to the 4th embodiment of the present disclosure. In FIG. 9A and FIG. 9B, the electronic device 40 in the 4th embodiment is a smart phone. The electronic device 40 includes a camera module (its reference numeral is omitted) and an image sensor (not shown). The image sensor is disposed on an image surface (not shown) of the camera module. The camera module includes a wide angle camera module 42, a high resolution camera module 43, and a telephoto camera module 44.

Further, the telephoto camera module 44 can be any camera module in the 1st embodiment, the 2nd embodiment, and the 3rd embodiment, but is not limited thereto. Therefore, it is favorable for satisfying the mass production requirement and the appearance requirement in the electronic device market nowadays.

The user enters the shooting mode through a user interface 41 of the electronic device 40. The user interface 41 in the 4th embodiment can be a touch screen with a touch control function, and the touch screen is for displaying the screen, and for adjusting the shooting angle manually so as to change the camera module. Finally, the camera module will converge the imaging light on the image sensor and output an electronic signal of the image to an image signal processor (ISP) 45.

In FIG. 9B, in order to meet the camera specification of the electronic device 40, the electronic device 40 can further include an optical anti-shake mechanism (not shown). Further, the electronic device 40 can further include at least one focusing assisting module (its reference numeral is omitted) and at least one sensing element (not shown). The focusing assisting module can be a flash module 46 which is favorable for compensating a color temperature, an infrared distance measurement component, and a laser focusing module, etc. The sensing element is favorable for sensing the physical momentum and the kinetic energy, for example, an accelerator, a gyroscope, and a Hall Effect Element so as to sense the shaking or the jitters applied by hands of the user or external environments, further, it is favorable for acquiring a better image quality by disposing the optical anti-shake mechanism and the focusing assisting module in the camera module of the electronic device 40. Further, the electronic device 40 according to the present disclosure has a capturing function with multiple modes, for example, optimizing the selfies, high dynamic range (HDR) under a low light condition, 4K resolution recording, etc. Furthermore, the user can visually see a captured image on the shooting screen of the camera by the user interface 41. Moreover, the user interface 41 is capable of operate the view finding range manually to achieve the autofocus function of what you see is what you get.

Further, the camera module, the image sensor, the optical anti-shake mechanism, the sensing element, and the focusing assisting module can be disposed on a Flexible Printed Circuitboard (FPC) (not shown). Therefore, it is favorable for shooting the pictures by connecting the image signal processor 45 with a connector (not shown) electrically. Current electronic devices such as smart phone have a tendency to be thinner and lighter. Therefore, it is favorable for satisfying the limited space mechanism design and the circuit layout requirement in the electronic devices by disposing the camera module and the related elements on the Flexible Printed Circuitboard, and using the connector to integrate the circuit to the main board of the electronic device so as to acquire a bigger allowance. On the other hand, it is favorable for the autofocus function of the camera to be controlled more flexible by the touch screen of the electronic device. In the 4th embodiment, the electronic device can include a plurality of sensing elements and a plurality of focusing assisting modules. The sensing elements and the focusing assisting modules are disposed on the Flexible Printed Circuitboard and another at least one Flexible Printed Circuitboard (not shown). Therefore, it is favorable for shooting the pictures by connecting the image signal processor 45 with a connector electrically. In other examples of the 4th embodiment (not shown), the sensing element and the focusing assisting module can be disposed on the main board of the electronic device or other forms of board according to the mechanism design and the circuit layout requirement.

Further, the electronic device 40 can further include, but not limited to a display unit, a control unit, a storage unit, a RAM, a ROM or other combinations.

Figure 9C:
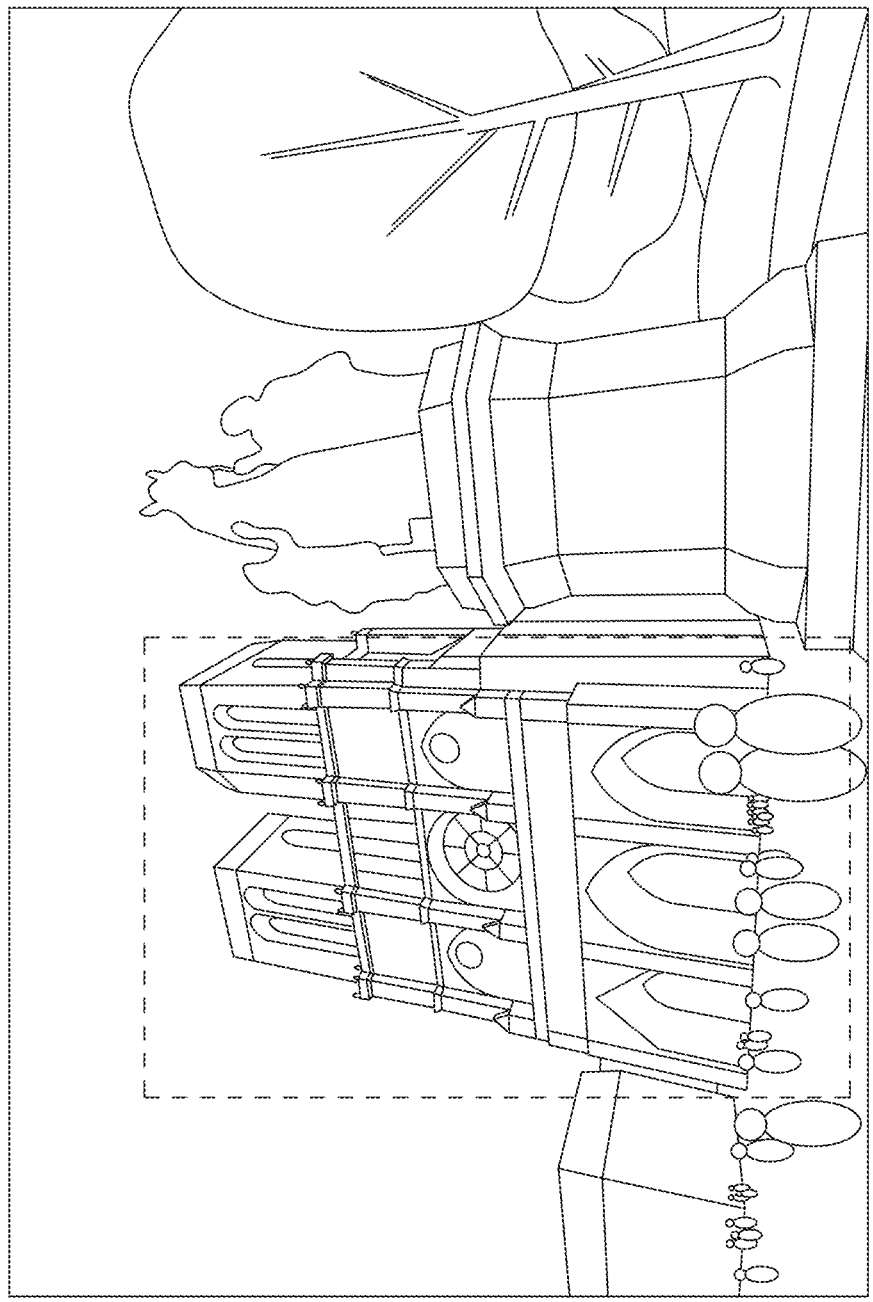
FIG. 9C is a schematic view of a picture shot by the electronic device according to FIG. 9A of the 4th embodiment.

FIG. 9C is a schematic view of a picture shot by the electronic device 40 according to FIG. 9A of the 4th embodiment. In FIG. 9C, it is favorable for capturing a wider angle photo by the wide angle camera module 42 so as to accommodate more scenes.

Figure 9D:
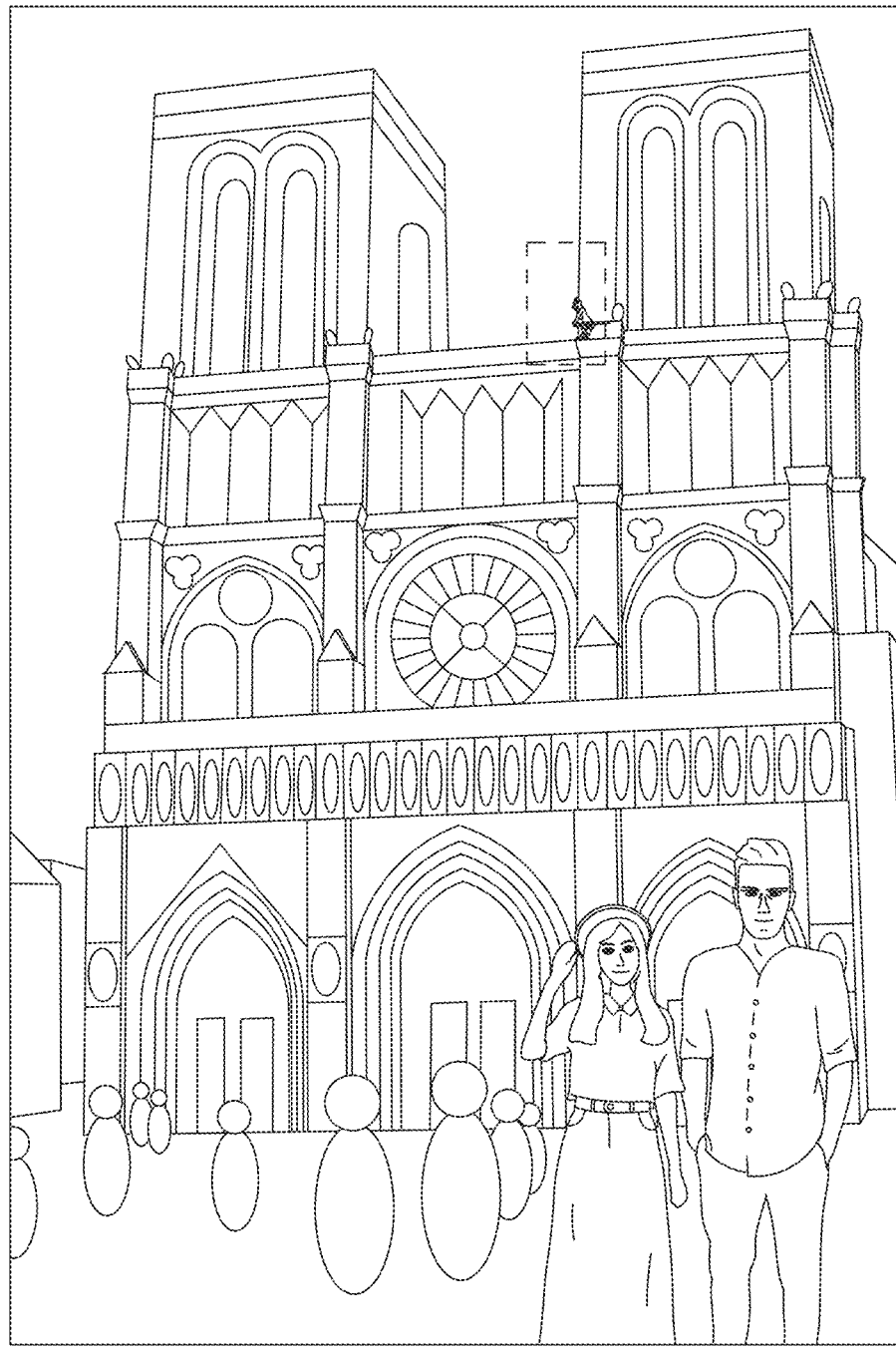
FIG. 9D is a schematic view of another picture shot by the electronic device according to FIG. 9A of the 4th embodiment.

FIG. 9D is a schematic view of another picture shot by the electronic device 40 according to FIG. 9A of the 4th embodiment. In FIG. 9D, it is favorable for capturing a high resolution image in a limited range by the high resolution camera module 43 so as to meet the features of high resolution and low distortion.

Figure 9E:
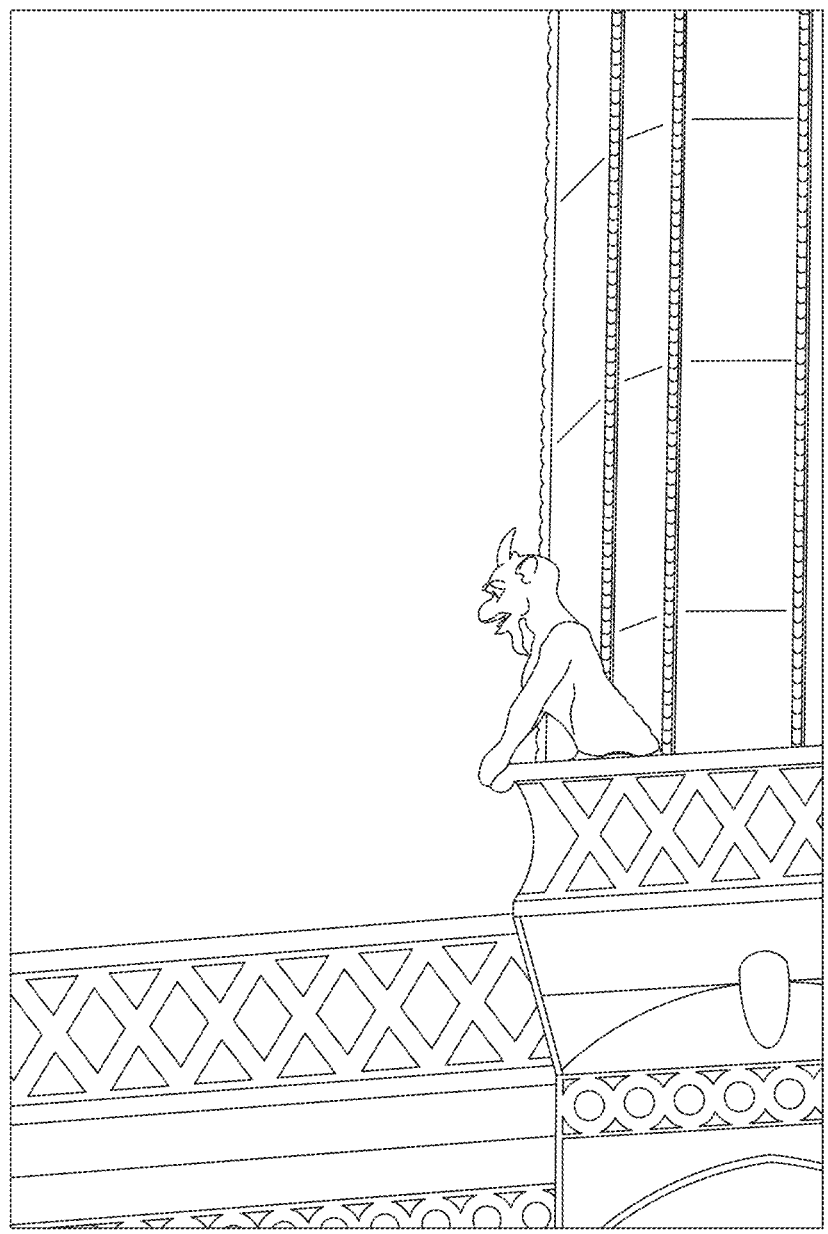
FIG. 9E is a schematic view of another picture shot by the electronic device according to FIG. 9A of the 4th embodiment.

FIG. 9E is a schematic view of another picture shot by the electronic device 40 according to FIG. 9A of the 4th embodiment. In FIG. 9E, the telephoto camera module 44 has high amplification function, which can capture the long distance image and amplify to the high amplification.

In FIGS. 9C to 9E, it is favorable for zooming the image of the electronic device 40 by capturing the image in different focal lengths of the camera module with the image processing techniques.

5th Embodiment

Figure 10:
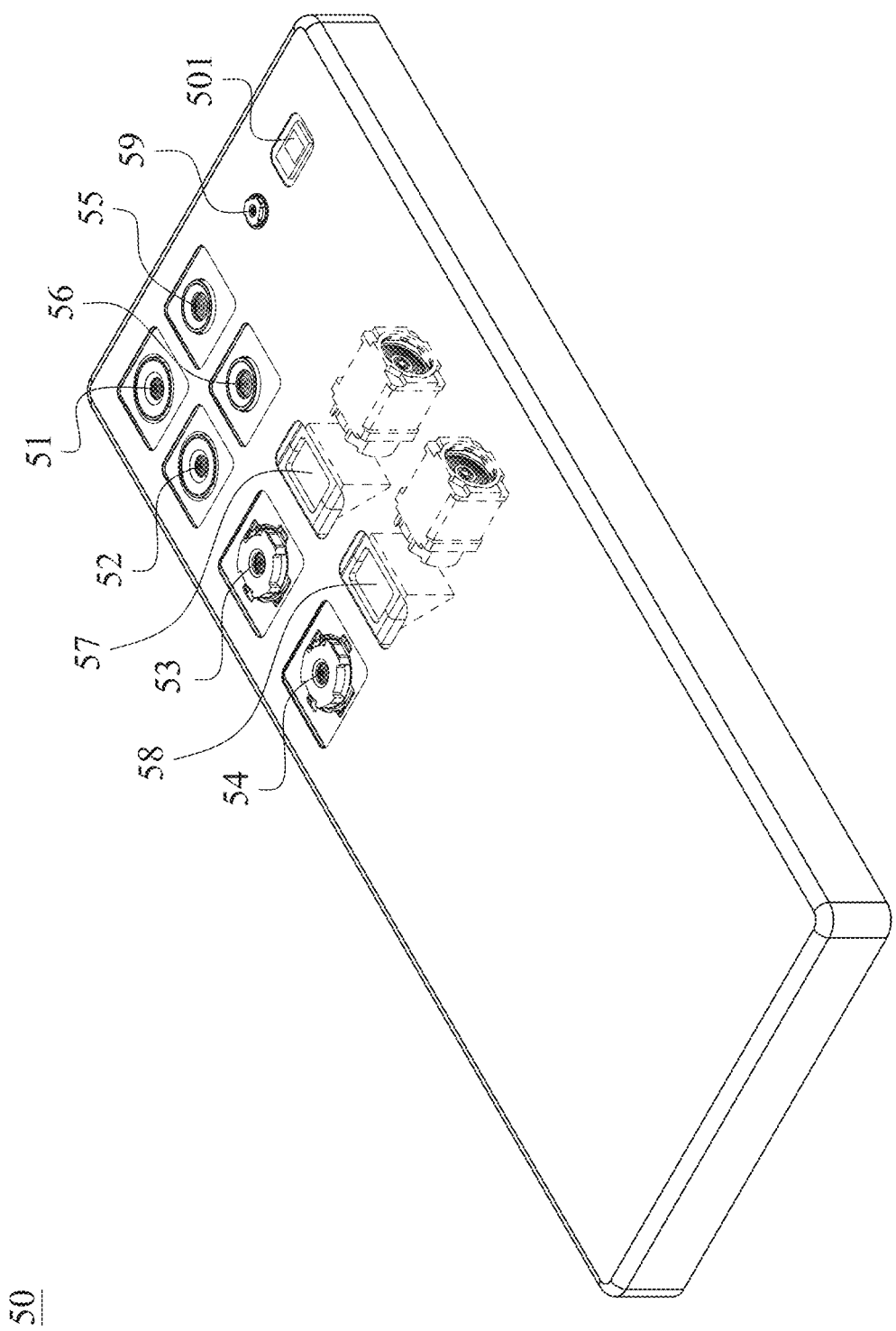
FIG. 10 is a schematic view of an electronic device according to the 5th embodiment of the present disclosure.
Figure 11:
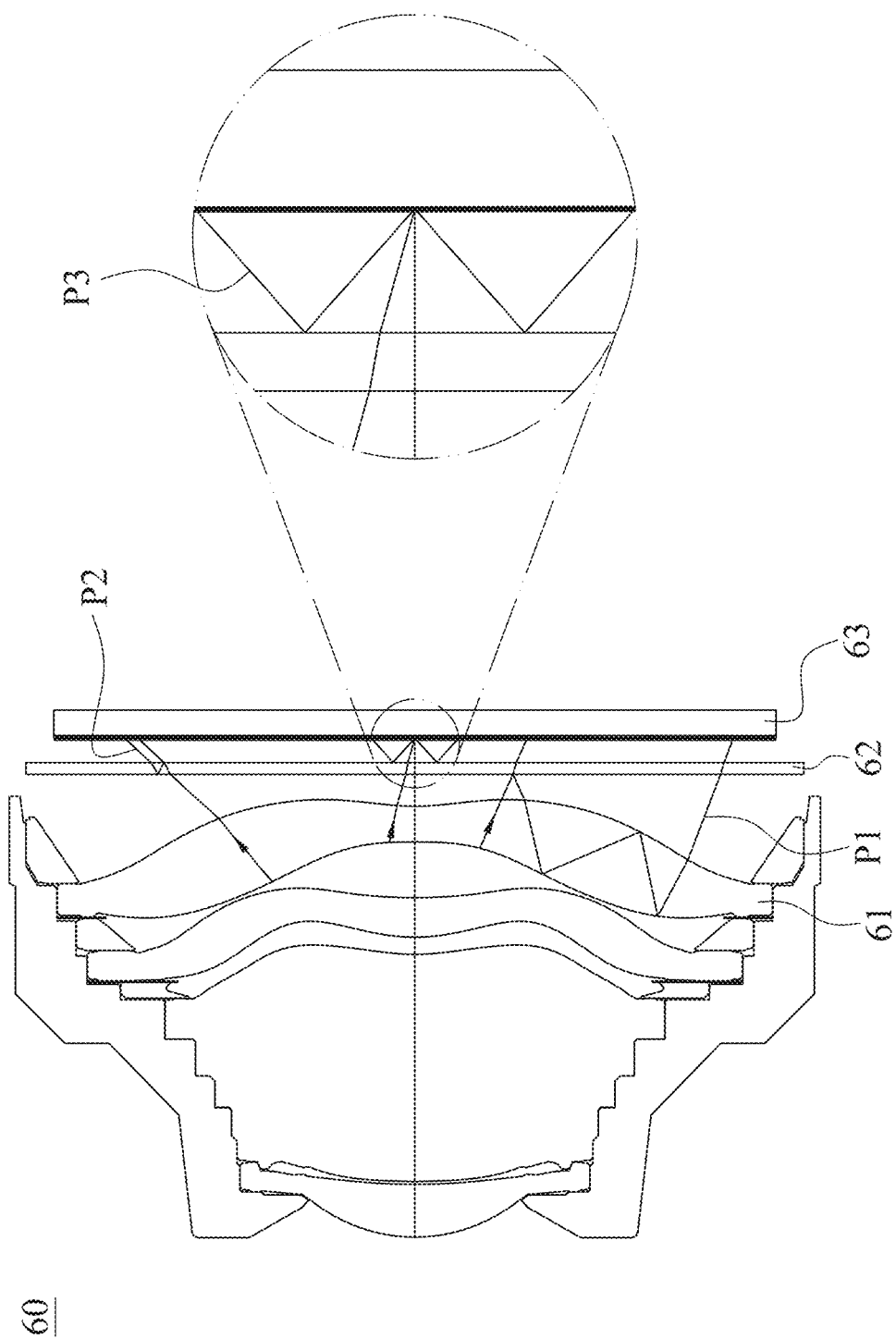
FIG. 11 is a schematic view of a camera module of the conventional art.

FIG. 10 is a schematic view of an electronic device 50 according to the 5th embodiment of the present disclosure. In FIG. 10, the electronic device 50 is a smart phone. The electronic device 50 includes a camera module (its reference numeral is omitted) and an image sensor (not shown). The image sensor is disposed on an image surface (not shown) of the camera module. The camera module includes ultra-wide angle camera modules 51, 52, wide angle camera modules 53, 54, telephoto camera modules 55, 56, 57, 58, and a TOF (Time-Of-Flight) module 59. The TOF module 59 can be displaced to other imaging devices, but is not limited thereto.

Further, the telephoto camera modules 55, 56, 57, 58 can be any camera module in the 1st embodiment, the 2nd embodiment, and the 3rd embodiment, but is not limited thereto. Therefore, it is favorable for satisfying the mass production requirement and the appearance requirement in the electronic device market nowadays.

Moreover, the telephoto camera modules 57, 58 are favorable for folding the light path, but are not limited thereto.

In order to meet the camera specification of the electronic device 50, the electronic device 50 can further include an optical anti-shake mechanism (not shown). Further, the electronic device 50 can further include at least one focusing assisting module (not shown) and at least one sensing element (not shown). The focusing assisting module can be a flash module 501 which is favorable for compensating a color temperature, an infrared distance measurement component, and a laser focusing module, etc. The sensing element is favorable for sensing the physical momentum and the kinetic energy, for example, an accelerator, a gyroscope, and a Hall Effect Element so as to sense the shaking or the jitters applied by hands of the user or external environments, further, it is favorable for acquiring a better image quality by disposing the optical anti-shake mechanism and the focusing assisting module in the camera module of the electronic device 50. Further, the electronic device 50 according to the present disclosure has a capturing function with multiple modes, for example, optimizing the selfies, high dynamic range (HDR) under a low light condition, 4K resolution recording, etc.

Further, the structure and the configuration of others elements in the 5th embodiment are the same as the elements in the 4th embodiment, and will not be described herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising:
   an imaging lens assembly;
   an image sensor disposed on an image surface of the imaging lens assembly; and
   an optical plate disposed between the imaging lens assembly and the image sensor, comprising:
   a substrate having an object-side surface and an image-side surface, the object-side surface facing towards an object side, the image-side surface facing towards an image side, and the object-side surface being parallel with the image-side surface; and
   at least one anti-reflection layer disposed on the image-side surface of the substrate, the at least one anti-reflection layer comprising a nanocrystal structure layer and an optical-connecting layer, wherein the nanocrystal structure layer comprises a metal oxide crystal, the optical-connecting layer connects the substrate and the nanocrystal structure layer, the nanocrystal structure layer is physically contacted with the optical-connecting layer, and the nanocrystal structure layer is arranged irregularly;
   wherein a material refractive index of the nanocrystal structure layer is Nc, a material refractive index of the optical-connecting layer is Nf, a height of the nanocrystal structure layer is Hc, a thickness of the optical-connecting layer is Hf, a total height of the anti-reflection layer is H, and the following conditions are satisfied:

$Nf < Nc$;

$Hf + Hc = H$; and $Hf < Hc$.

2. The camera module of claim 1, wherein a number of the at least one anti-reflection layer is two which are disposed on the object-side surface and the image-side surface of the substrate, respectively.

3. The camera module of claim 1, wherein the optical plate is a polarizer.

4. The camera module of claim 1, wherein an image-side optical surface of the imaging lens assembly is an optical aspheric surface, and the optical aspheric surface has at least one inflection point.

5. The camera module of claim 1, wherein the thickness of the optical-connecting layer is Hf, and the following condition is satisfied:

$20 \text{ nm} < Hf < 120 \text{ nm}$.

6. The camera module of claim 5, wherein the thickness of the optical-connecting layer is Hf, and the following condition is satisfied:

$40 \text{ nm} < Hf < 90 \text{ nm}$.

7. The camera module of claim 1, wherein the material refractive index of the nanocrystal structure layer is Nc, a material refractive index of the substrate is Ns, and the following condition is satisfied:

$Ns < Nc$.

8. The camera module of claim 1, wherein the height of the nanocrystal structure layer is Hc, and the following condition is satisfied:

$120 \text{ nm} < Hc < 350 \text{ nm}$.

9. The camera module of claim 8, wherein the height of the nanocrystal structure layer is Hc, and the following condition is satisfied:

$150 \text{ nm} < Hc < 300 \text{ nm}$.

10. The camera module of claim 1, wherein the substrate of the optical plate is a glass substrate.

11. An electronic device, comprising:
    the camera module of claim 1.

12. A camera module, comprising:
    an imaging lens assembly;
    an image sensor disposed on an image surface of the imaging lens assembly; and
    an optical plate disposed between the imaging lens assembly and the image sensor, comprising:
    a substrate having an object-side surface and an image-side surface, the object-side surface facing towards an object side, the image-side surface facing towards an image side, the object-side surface being parallel with the image-side surface; and
    at least one anti-reflection layer disposed on the object-side surface of the substrate, the at least one anti-reflection layer comprising a nanocrystal structure layer and an optical-connecting layer, wherein the nanocrystal structure layer comprises a metal oxide crystal, the optical-connecting layer connects the substrate and the nanocrystal structure layer, the nanocrystal structure layer is physically contacted with the optical-connecting layer, and the nanocrystal structure layer is arranged irregularly;
    wherein, a material refractive index of the nanocrystal structure layer is Nc, a material refractive index of the optical-connecting layer is Nf, a height of the nanocrystal structure layer is Hc, a thickness of the optical-connecting layer is Hf, a total height of the anti-reflection layer is H, and the following conditions are satisfied:

Nf<Nc;

Hf+Hc=H; and

Hf<Hc.

13. The camera module of claim 12, wherein the optical plate is an infrared filter.

14. The camera module of claim 12, wherein the thickness of the optical-connecting layer is Hf, and the following condition is satisfied:

20 nm<Hf<120 nm.

15. The camera module of claim 14, wherein the thickness of the optical-connecting layer is Hf, and the following condition is satisfied:

40 nm<Hf<90 nm.

16. The camera module of claim 12, wherein the height of the nanocrystal structure layer is Hc, and the following condition is satisfied:

120 nm<Hc<350 nm.

17. The camera module of claim 16, wherein the height of the nanocrystal structure layer is Hc, and the following condition is satisfied:

150 nm<Hc<300 nm.

18. The camera module of claim 12, wherein an image-side optical surface of the imaging lens assembly is an optical aspheric surface, and the optical aspheric surface has at least one inflection point.

* * * * *